United States Patent Office 3,484,718
Patented Dec. 16, 1969

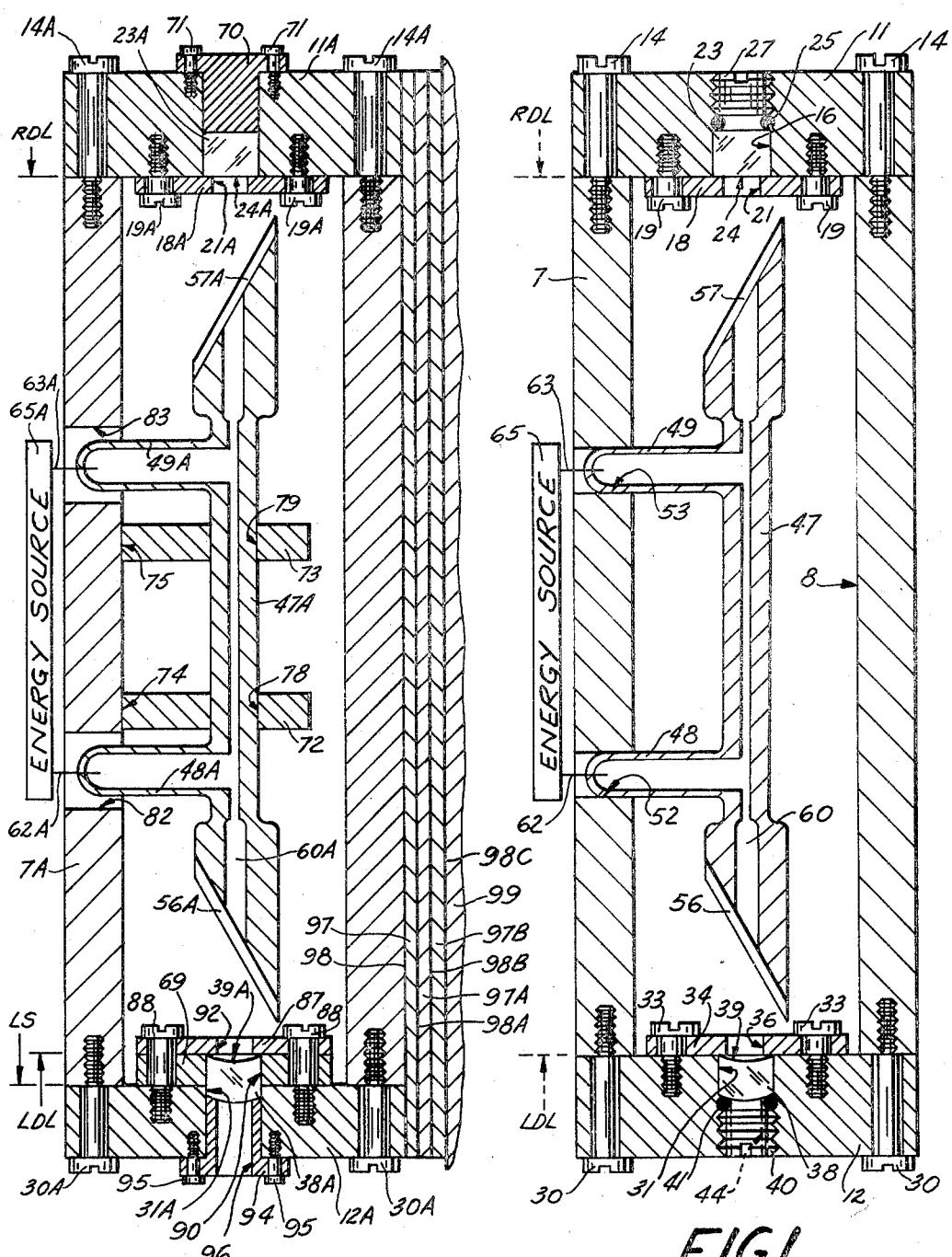

3,484,718
STABILIZED LASER STRUCTURE
Jack D. Foster, Danville, Calif., assignor to Kearney & Trecker Corporation, West Allis, Wis., a corporation of Wisconsin
Filed May 26, 1966, Ser. No. 553,150
Int. Cl. H01s 3/02
U.S. Cl. 331—94.5                8 Claims

ABSTRACT OF THE DISCLOSURE

This invention relates to apparatus for improving the stability of laser structures. A principal embodiment provides an outer tubular support formed of material having a low coefficient of expansion and disposed to fixedly support an axially aligned gas filled plasma tube having axially aligned end windows. The plasma tube is axially aligned between a pair of light reflective lenses secured to the opposite ends of the tubular support. An expansible tubular spacer having a high coefficient of expansion is positioned to space one of the lenses inwardly from one end of the tubular support and in an axial direction toward an end lens of the plasma tube. During any thermal changes occurring during energization of the plasma tube is a lasing action, the proportionally opposed expansion between the tubular spacer and the elongated tubular support tends to maintain the necessary accurate parallel spacing between the axially aligned reflective lenses one of which is light transmissive.

---

A general object of this invention is to provide an improved mechanically stable laser structure.

Another object of the invention is to provide a laser structure particularly suited to a single frequency operation.

Another object is to provide a stable laser structure having improved means for maintaining uniform spacing between the end reflective mirrors irrespective of temperature variations during laser operation.

Another object of the invention is to provide a stable support structure for a laser in which axial expansion in one direction is offset by predetermined axial expansion in the opposite direction for maintaining uniform spacing between the reflective mirrors of a laser.

Another object of the invention is to provide a supporting structure for a laser incorporating positive stops adapted to maintain the end reflectors in uniform spaced spaced apart positions irrespective of changes in temperature during operation.

Another object is to provide a supporting structure for a laser which is insensitive to environmental vibration excitations.

Another object of the invention is to provide acoustical isolation for a laser structure which rigidly supports the laser structure with respect to a machine upon which the laser is secured, but which also provides effective rejection of acoustical waves propagating toward the laser.

According to this invention, a laser is provided with an elongated housing structure having a tubular opening extending therethrough, and a pair of end plates secured to the opposite ends thereof to constitute an enclosed chamber. The end plates are provided with axially aligned bored openings for receiving end reflectors or mirrors which are urged inwardly therein against annular stops fixedly secured to the inner faces of the respectively associated end plates. One of the end reflectors is slightly less reflective than the other, anl is semi-transparent for emitting amplified coherent light. Rigidly expansible means are secured to the end plates for maintaining the respective end reflectors abutting the associated annular stops. Within the tubular housing, a gas filled plasma tube is secured in axially aligned relationship to the end reflectors. Upon electrical energization of the plasma tube, the gas therein is raised to excited energy levels in a manner that light is emitted in axially outward directions from both ends of the tube. As the emitted light waves are reflected back and forth between the respective end reflectors and the plasma tube, the amplitude therein increases until a coherent, monochromatic beam of light is emitted by that particular one of the end reflectors that is slightly less reflective than the other. The arrangement is such that the distance between the end reflectors or mirrors is maintained at a uniform predetermined distance irrespective of variations in temperature that occur.

The foregoing and other objects of the invention which will become more fully apparent from the following detailed description of apparatus exemplifying this invention, may be achieved by the particular laser described herein as a preferred embodiment thereof in connection with the accompanying drawings, in which:

FIGURE 1 is an enlarged view in longitudinal vertical section through a laser incorporating one form of the invention; and, FIGURE 2 is an enlarged view in longitudinal vertical section through a laser incorporating a modified form of the invention.

The improved stabilized laser illustrated and disclosed with reference to FIGS. 1 and 2 is particularly well suited for use in any laser interferometer.

Referring to the drawings, and particularly to FIGURE 1 thereof, there is shown a tubular laser surrport structure 7 having an opening 8 extending therethrough. The opposite ends of the tubular laser structure 7 are provided with perpendicular mounting faces respectively adapted to receive circular end plates 11 and 12. The upper end plate 11 is fixedly secured to the corresponding end of the laser structure 7 by means of cap screws 14. The end plate 11 is provided with a lens receiving circular opening 16 having an outward tapped portion. To the inner face of the end plate 11 there is secured a lens stop member 18 by means of cap screws 19. Preferably, the cap screws 14 and 19 are made of material identical to that from which the end plate 14 and stop member 18 are made to obviate differential thermal expansion. The member 18 is provided with a central circular opening 21 concentric with and slightly smaller in diameter than the circular opening 16 in the end plate 11. Thus, due to the smaller diameter bored opening 21, the stop member 18 provides a flanged shoulder or annular stop adapted to receive the edge of a flat, circular lens 23. The face of the circular lens 23 is maintained in abutting engagement with the annular stop presented by the stop member 18, the stop constituting a datum end position for a completely reflective inner face 24 of the lens 23 which is adapted to constitute one end reflector or mirror for the laser. For retaining the lens 23 in its axially inward position, as shown in FIG. 1, a resilient washer 25 or O ring is urged into abutting engagement with the outer face of the circular lens 23 by a large diameter set screw 27. The set screw 27 is tightened sufficiently within the tapped hole in the end plate 11 to compress the O ring 25 against the outer face of the lens 23. Thus, the O ring 25 constitutes resilient means adapted to continuously urge the circular lens 23 inwardly for retaining the inner face thereof in abutting engagement with the annular shoulder presented by the stop member 18, and in alignment with a datum line indicated at RDL.

In a similar manner, the opposite end plate 12 is secured directly to the lower, perpendicular end face of the tubular housing structure 7 by cap screws 30. The end plate 12 is likewise provided with a lens receiving circular opening 31 that is disposed in axial alignment with the circular opening 16 formed within the end plate 11. Cap screws 33 are disposed to secure a lens stop member 34 to the inner face of the end plate 12. Both pairs of the cap screws 30 and 33 are made of the identical material as the end plate 12 and the lens stop member 34 respectively associated therewith to obviate differential thermal expansion. Toward its central portion, the stop member 34 is provided with a central, circular opening 36, that is concentric with the circular opening 31 in the end plate 12 but of a smaller diameter. Thus, the smaller opening 36 provides a flanged shoulder or an annular stop to position a semi-transparent hemispherical lens 38 which is carried within the aligned circular opening 31 formed in the end plate 12. The inner face of the hemispherical lens 38 is provided with a reflective face 39, positioned in substantial axial alignment with the reflective surface 24 presented by the circular, flat lens 23. A tubular set screw 40 is threadedly secured within a tapped opening in the end plate 12 to compress a resilient washer 41 or O ring against the outer edge of the circular outer face of the lens 38. The resilient ring 41 is compressed sufficiently to urge the inner edge of the lens 38 into continuous abutting engagement with the annular stop shoulder formed by the smaller diameter bored opening 36 in the lens stop member 34.

In order that amplified, coherent light can be emitted from within the tubular housing 7, the tubular set screw 40 is provided with a central bored opening 44 to expose the central portion of the outer face of the hemispherical lens 38. As known in the art, the lens 23 and the hemispherical lens 38 are provided on their inner faces with reflective surfaces 24 and 39, such as formed by vacuum deposited multilayer dielectrics. Actually, the lens 38 is a combined hemispherical mirror and semi-transparent, collimating or beam expanding lens. The laser illustrated in FIGURE 1 is a light generator operative to emit intense light of a single frequency via the semi-transparent lens 38 and bored tubular opening 44. The arrangement is such that the upper flat lens 23 is completely reflective. The semi-transparent, hemispherical lens 38 is slightly less reflective in a manner that amplified coherent light can be transmitted therethrough, and thence through the bored opening 44 in the outer lens securing set screw 40 to provide a well collimated beam of intense coherent light. The reflective face 39 of the lens 38 is maintained in engagement with the stop member 34 as indicated by a datum line LDL in FIG. 1.

Within the tubular laser structure 7, there is secured a gas filled plasma tube 47 having integrally formed therewith two, spaced apart, laterally formed tubular extensions 48 and 49. The tubular extensions 48 and 49 are respectively secured within a pair of axially aligned bored openings 52 and 53 formed in a side wall of the tubular laser structure 7. Preferably, the tubular extensions 48 and 49 are adhesively secured within the complementary bored openings 52 and 53 in a manner to maintain the plasma tube 47 in an axially aligned position between the spaced apart reflective lenses 23 and 38.

At its opposite ends, the plasma tube 47 is provided with optical flat surfaced windows 56 and 57 integrally formed therewith and respectively inclined at Brewster's angle. As schematically illustrated in the sectional view in FIGURE 1, the plasma tube 47 is provided with a central opening 60, this opening extending axially through the tube and laterally into the respective tubular extensions 48 and 49. The cavity or opening 60 within the plasma tube 47 is filled with a gas, for example a mixture of helium and neon. To energize the gas within the tube 47, the tubular extensions 48 and 49 are respectively connected by a pair of conductors 62 and 63 for selective energization in well-known manner by an energy source 65.

Upon selective energization of the plasma tube 47 by the energy source 65, the helium-neon gas contained therein is raised to excited energy levels, thereby emitting waves of light through the angularly inclined, optical flat windows 56 and 57 toward the respective end reflectors 23 and 38. As this occurs, light is reflected back and forth between the flat reflector 24 and the hemispherical reflector 39 toward the opposite ends of the plasma tube 47. As these light waves continue to travel back and forth, the amplitude increases until a coherent monochromatic beam of collimated light is emitted by the slightly less reflective, semi-transparent hemispherical reflector 38 via the tubular opening 44 in the lens retaining set screws 40.

During energization to provide coherent light, the plasma tube 47 acts as a quantum mechanical amplifier. Further, the two end reflectors 23 and 38 cooperate therewith to form a Fabry-Perot Interferometer and provide a continuous positive feedback to the amplifying plasma tube 47 for maintaining oscillation.

As the laser illustrated in FIGURE 1 is being energized to produce coherent light, it will be apparent that the laser support structure 7 and end plates 11 and 12 provide an enclosed tubular chamber or cavity and likewise provide a support for maintaining the end reflectors 23 and 38 in predetermined spaced apart relationship to the plasma tube 47. For single frequency operation, the spacing between the end reflectors 23 and 38 must be such that the frequency spacing of the interferometer resonances throughout the spectral range is greater than the threshold half width of the broadened spectral line of the amplifying medium. Preferably in the present instance, this is achieved by making the spacing between the reflective faces 24 and 39 presented by the end reflective lenses 23 and 38 short, i.e., ten centimeters or less. This distance between the end reflectors produces a frequency spacing of the interferometer resonances that are extremely large, i.e., 1500 mHz. or greater.

During operation, the optical path length delineated by the respective reflective faces 24 and 39 of the end reflectors 23 and 38 comprising the interferometer cavity must be maintained at a uniform predetermined spacing within very close limits. A change of the optical path length, for example, by one-half light wave length (approximately 12 micro inches), will cause the interferometer resonances to move one resonance frequency spacing in a manner that each resonance will then take the place of the one preceding it. The effect of such a change in optical path length between the end reflectors would be a decrease in the laser output followed by either a cessation of laser output, or dual frequency operation, depending upon the ratio of threshold half width and resonance frequency spacing. Subsequently, the laser output would then increase to the starting single frequency level.

Upon energization of the plasma tube 47, FIGURE 1, to provide the desired single frequency of coherent light, heat is generated within the enclosed tubular chamber 7. After a short warmup time a state of thermal equilibrium occurs. Variations in the environmental temperature after equilibrium has been attained function to produce changes in the equilibrium temperature of the laser parts. To prevent such changes in the equilibrium temperature from changing the predetermined axial spacing between the reflective faces 24 and 39 respectively presented by lenses 23 and 38, the housing 7 is made of material with the proper zero, or slightly negative, coefficient of expansion, such as properly heat treated high purity Invar. The end plates 11 and 12, as well as the cooperating lens stop members 18 and 34, are preferably made of free machining Invar, having a low thermal coefficient of expansion. In addition, the cap screws 14 and 30 for the end plates, and the cap screws 19 and 33 for the lens stop members, are made from the same free machining Invar having the same low thermal coefficient of expansion that the plates 11, 13, 18 and 34 which they secure are made from. In this manner no differential thermal expansion occurs between the plates and the securing screws. All screws are tightened in such a manner that the tension in them produces sufficient compressive stress on the mating members that no joints experience states of zero stress when the structure is subject to normal vibration excitations. All resonance vibration frequencies of the joints therefor will occur at high frequencies such as 20 kHz. where environmental inputs are normally low.

With the laser structure illustrated in FIGURE 1 constructed of material and in the manner hereinbefore described, the effective coefficient of expansion of the laser may be reduced to zero for an acceptable temperature range. Thus, during operation of the laser illustrated in FIGURE 1 to produce coherent light of a predetermined single frequency, the axial spacing between the reflective faces 24 and 39 presented by the end reflectors 23 and 38 remains substantially constant to maintain the coherent beam of light emitted by the collimating lens 38 continuously very close to the predetermined single frequency.

In a modified form of the invention, as shown in FIG. 2, a laser support structure 7A is made of a material having a low positive coefficient of expansion such as Invar. Upon the occurrence of an increase in the environmental temperature during operation of the laser illustrated in FIG. 2, the laser support structure 7A expands slightly in an axial direction to cause a similar change in spacing between the inner faces of the laser end plates 11A and 12A. Also the optical path length will expand due to changes in the index of refraction of the Brewster's angle windows and of the air path between the windows and the mirrors. To counteract or offset the axial expansion of the support structure 7A, and the index of refraction of the windows and the air, the laser illustrated in FIG. 2 is provided with a spacer member 69 shown adjacent the lower laser end plate 12 and in encircling relationship to the central portion of the hemispherical lens 38A. The spacer member 69 is preferably made of a material having a high coefficient of expansion such as aluminum. The arrangement is such that the total axial expansion of the spacer member 69 is approximately the same as the total axial expansion of the laser support structure 7A which is made of an Invar having an extremely low positive coefficient of expansion, plus the axial expansion of the optical path due to the index of refraction change in the Brewster's windows and the air. The slightly negative coefficient of expansion described above for 7 of FIGURE 1 may be chosen such that it offsets the positive expansion of the optical path due to changes in the index of refraction of the Brewster's angle windows and the air path.

To facilitate the description, identical reference numerals, with the suffix A, have been applied to those parts of the laser illustrated in FIG. 2 that correspond in function and mode of operation to the similar type parts of the laser shown in FIGURE 1. For example, the upper end of the laser in FIG. 2, including the end plate 11A and cooperating lens stop member 18A, are secured by cap screws 19A and to the perpendicular end face of the tubular support structure 7A by cap screws 14A in a manner to support the circular flat lens 23A in proper axial alignment with the laser plasma tube 47A illustrated in FIG. 2. To maintain the inner reflective face 24A of the lens 23A in abutting engagement with the stop member 18A, a flanged insert 70 is secured to the outer face of the end plate 11A by cap screws 71. The flanged insert 70 engages the rearward face of the lens 23A, thereby maintaining the edge of the front face 24A thereof engaging the stop member 18A. A bored circular opening 21A in the lens stop member 18A exposes the reflective face 24A of the circular lens 23A for reflectively returning a beam of light to the energized plasma tube 47A. A pair of arcuately formed support webs 72 and 73 are adhesively bonded to the complementary arcuately formed inner wall of the tubular opening 8A of the laser structure 7A as indicated at 74 and 75. The plasma tube support webs 72 and 73 are respectively provided with semi-circular openings 78 and 79 that partially encircle the central portion of the tube 47 and are adhesively bonded thereto.

Thus, the plasma tube 47 is rigidly secured within the support structure 7A in axial alignment between the flat circular lens 23 Aand the hemispherical lens 38A. The lateral extensions 48A and 49A integrally formed with the plasma tube 47A extend through circular openings 82 and 83 formed in the wall of the laser structure 7A. To energize the mixture of gases within the opening 60A of the plasma tube 47A, the lateral extensions 48A and 49A are connected via conductors 62A and 63A to a selectively energizable source of energy 65A.

As shown in FIG. 2, the axially expansible spacer member 69 is maintained in abutting engagement with the inner face of the end plate 12A by a lens stop member 87. The end plate 12A is secured to the end face of the tubular support structure 7A by cap screws 30A. A pair of cap screws 88 extend through suitably bored holes in the stop member 87 and the spacer member 69 to threadedly engage tapped holes in the end plate 12A. To encircle the central, inner portion of the hemispherical lens 38A, the spacer member 69 is provided with a circular opening 90 concentric with the circular opening 31A in the end plate 12A. Likewise, the lens stop member 87 is provided with a circular opening 92 slightly smaller in diameter than the concentric opening 90 in the spacer member 69. It will be apparent, therefore, that the flanged shoulder resulting from the smaller diameter opening 92, renders the inner face of the lens stop member 87 a limit stop for the hemispherical lens 38A.

In the sequence of assembling these parts, it should be noted that prior to the end plate 12A being secured to the tubular structure 7A, the members 87 and 69 are rigidly secured to the inner face of the end plate 12A. After the members 87 and 69 are secured in position, the end plate 12A is then secured to the perpendicular end face of the tubular support structure 7A by tightening the cap screws 30A. After this, the hemispherical lens 38A is placed in position within the concentric openings 90 and 31A formed within the members 69 and 12A. Next, a flanged tubular insert 94 is secured to the outer face of the end plate 12A with the tubular portion extending within the opening 31A. To maintain the inner face 39A of lens 38A abutting the stop member 87, the flanged insert 94 is secured to the end plate 12A by cap screws 95 with the tubular portion of the insert abutting the outer face of the lens 38A. The flanged insert 94 provides a resilient pressure for continuously maintaining the inner face 39A of the lens 38A in abutting engagement with the stop member 87.

During an increase in temperature, therefor, the spacer member 69 expands axially to urge the stop member 87 axially inward toward the plasma tube 47A, and relative to the inner face of the end plate 12A. As this occurs, the reflective face 39A of the lens 38A is maintained in abutting engagement with the stop member 87 due to the resilient operation of the flanged insert 94. At the same time, the lens 38A is being moved axially inward relative to the end plate 12A, the end plate itself is being moved in an axially outward direction due to the longitudinal expansion of the tubular laser structure 7A. For permitting the emergence of a coherent light beam from the semi-reflective lens 38A, the flanged insert 94 is provided with a tubular bored opening 96.

During initial assembly, the three pairs of cap screws 30A, 88 and 95 are tightened enough that the tension in them produces sufficient compressive stress on the mating parts so that no joints experience states of zero stress when the structure is subject to normal vibration excitations.

Axial expansion of the tubular laser structure 7A and the increases in the index of refraction in the Brewster's windows 56A and 57A, and the air paths therebetween operate to increase the optical distance between the datum line RDL for the reflective lens face 24A and the line LS delimiting the opposite end of the structure 7A. Offsetting the axial optical distance expansion is the axial expansion of the spacer member 69, as shown in FIG. 2, which urges the lens stop member 87 in an axial direction toward the lens 23A. Upon axial expansion of the spacer member 69, therefore, the distance between the datum line LDL for the reflective lens face 39A and the line LS is increased a distance sufficient to maintain the datum line LDL for the lens face 39A the same uniform distance relative to the datum line RDL. It will be apparent therefore that a uniform predetermined distance is maintained between the reflective faces 24A and 39A of the lenses 23A and 38A, irrespective of variations in temperature that may occur. Upon selective activation of the energy source 65A to energize the plasma tube 47A, therefore, an intense coherent light beam of preselected single frequency will be transmitted outwardly by the hemispherical lens 38A.

It will be apparent that an axially expansible spacer member may be associated with the lens 23A instead of the lens 38A, as shown and described with reference to FIG. 2. Furthermore, separate spacer members similar to member 69, FIG. 2, may be required in association with both end reflectors for maintaining the required uniformity in distance therebetween in the event the housing structure has a greater positive coefficient of expansion.

To further stabilize the output of the laser illustrated in FIG. 2, the laser support structure 7A is fixedly secured to one intermediate support plate 97 by a layer of adhesive 98. The support plate 97 is, in turn, secured to a support plate 97A by a layer of adhesive 98A; and plate 97A is secured to a plate 97B by a layer of adhesive 98B. Another layer of adhesive 98C is disposed to secure the support plate 97B to a machine member 99. The machine member 99, shown in fragmentary form in FIG 2, comprises a portion of an apparatus upon which the laser is being used, and may be a portion of either a machine tool, or a measuring machine.

The multiple support plates 97, 97A and 97B are preferably made of a material having a low coefficient of expansion, such as free machining Invar. Likewise, each of the plates 97, 97A and 97B is selected to provide an abrupt change in the acoustic impedance, with the acoustic waves being reflected and absorbed in the intervening adhesive layers 98, 98A, 98B and 98C. Thus, the multiple plates 97, 97A and 97B, together with the adhesive layers 98, 98A, 98B and 98C comprise a unitary, laminated support for securing the laser to the machine member 99, and provide isolation from thermal strains, vibration, and shock acoustical inputs from the machine. This is due both to the abrupt changes in acoustic impedance, and the high acoustic wave reflectance resulting from the high damping effect of the adhesive layers.

The optical path length of a laser is predetermined to first order by four parameters including the following:

(1) the geometrical mirror separation;
(2) the geometrical alignment of the plasma tube;
(3) the index of refraction and thickness of the plasma tube windows; and,
(4) the index of refraction of the gas such as the air between the angularly inclined plasma tube windows and the reflective laser mirrors.

Each of the four parameters are sensitive to either environmental temperature changes, or structural distortions, or both.

The achievement of reliable long term single frequency operation and the degree of short term frequency stability are dependent on thermal stability and vibration sensitivity. The same requirements of high thermal stability and low vibration sensitivity are necessary to achieve high frequency stability in certain other lasers, including multi-frequency gas lasers, and solid state lasers.

Usually, the uses for high frequency stability gas lasers and single frequency gas lasers are of a precision optical nature requiring precise alignment of the laser beam with the optical structure. Normally, such a precision requirement precludes the use of lasers incorporating loosely coupled isolation supports.

It is reiterated that the stabilized laser structure exemplified in the present invention fully meets the high frequency stability requirements in a rigid laser structure having both precise optical alignments, and automatic compensating means for maintaining uniformity in the geometrical mirror separation.

From the foregoing detailed explanation of the operation of the exemplifying laser herein set forth as a practical embodiment of the present invention, it will appear that there has been provided a greatly improved laser structure having a high degree of both thermal and vibration stability for operating a laser at a predetermined frequency.

Although the illustrative embodiments of the invention have been described in considerable detail for the purpose of fully disclosing a practical operative structure by means of which the invention may be practiced, it is to be understood that the particular apparatus herein described is intended to be illustrative only and that the various novel characteristics of the invention may be incorporated on other structural forms without departing from the spirit and scope of the invention as defined in the subjoined claims.

The principles of this invention having now been fully explained in connection with the foregoing description, I hereby claim as my invention:

1. In a coherent light generator;
    a chamber having end reflective parallel members and with one of said member being light transmissive;
    a hollow tubular support housing enveloping said end reflective members adapted to maintain parallelism therebetween and being adapted to expand when heated in a manner tending to increase the distance between said end reflective members;
    expansible means interconnected between said hollow housing and one of said end reflective members operative in response to heat to expand in a direction opposite to the expansion of said housing to maintain the distance between said end reflective members substantially constant during temperature variations;
    a tubular plasma tube including gas carried therein and being supported within the chamber formed by said housing with end windows carried in axial alignment with said end reflective members presented by said chamber;
    support means interconnecting the inner periphery of said tubular housing with the outer periphery of said plasma tube for maintaining said end windows in optically centered relationship between said end reflective parallel members during axially expansible movement of said hollow tubular support housing; and,
    a power source for electrically activating the gas within said plasma tube for directing waves of light of predetermined frequency in opposite directions through said end windows and toward said end reflective members, said plasma tube operating to amplify the light reflectively returned by said end reflective members in a manner that amplified coherent light is emitted by said light transmissive end reflector.

2. A coherent light generator according to claim 1 in which said hollow housing is made of a material having one coefficient of expansion and said expansible means is made of a material having a coefficient of expansion greater than that of said housing.

3. A coherent light generator according to claim 1 including means for fixedly securing said housing, said end reflectors, said expansible means, and said plasma tube together for resisting thermal stresses, mechanical vibrations and shock acoustical inputs.

4. A coherent light generator according to claim 1 in which said housing is made of material having a low coefficient of expansion and said expansible means is made of aluminum.

5. A coherent light generator according to claim 1 in which said hollow housing is adhesively secured to an intermediate support plate and said support plate is adhesively secured to a machine member.

6. A coherent light generator according to claim 1 in which said hollow housing is adhesively secured to a laminated support comprising a plurality of support plates adhesively bonded together.

7. In a light generating laser;
a tubular support structure provided toward its opposite ends with end plates having axially aligned circular openings;
a pair of lens stop members respectively secured to the inner faces of said end plates, said stop members being provided with concentric circular openings smaller than the openings in said end plates to provide annular lens stops;
a first end reflector fitted within one circular end plate opening and being urged into abutting engagement with the associated one of said annular stops;
a second end reflector fitted within the other circular end plate opening and being urged into abutting engagement with said associated annular stop and being partially light transmissive, said second end reflector being positioned in axially aligned opposition to said first reflector;
separate compressibly resilient means respectively disposed within the circular end plate openings and being disposed to urge and continuously maintain said end reflectors in abutting engagement with said respective annular stops;
a gas filled plasma tube secured within said tubular support in axial alignment between said reflectors; and,
electrical means connected to energize said plasma tube to excite the gas therein for emitting light waves in both directions toward said end reflectors in a manner that amplification of reflected light by said plasma tube results in coherent light of predetermined single frequency being emitted from said light transmissive end reflector.

8. In a laser provided with a gas filled axially extending plasma tube having axially aligned light transmitting end windows;
a tubular support having a low coefficient of expansion carried in axially aligned outwardly spaced parallel relationship to said plasma tube, support means of a like low coefficient of expansion fixedly secured between the inner periphery of said support and the outer periphery of said plasma tube for maintaining said plasma tube in axially centered relationship within said support;
a pair of end reflective lenses fixedly carried at the opposite ends of said tubular support and in axial alignment with said end windows of said plasma tube, one of said lenses being less reflective than the other and being semi-transparent to pass amplified light;
an expansible tubular spacer fixedly secured in position to space one of said lenses axially inward from one of the outer ends of said tubular support, said tubular spacer having a much higher coefficient of expansion than said elongated tubular support for maintaining said end reflective lenses in uniformly spaced parallel relationship irrespective of changes in the axial expansion of said tubular support, said spacer being less than half as long as said tubular support;
a source of energy selectively operable to energize said plasma tube for activating said gas therein to emit light via the opposite ends of said plasma tube and toward said reflective lenses, said plasma tube being adapted to amplify the reflectively returned light waves sufficiently that a light wave of single frequency is directed outwardly toward said less reflective semi-transparent lens.

References Cited

UNITED STATES PATENTS

| | | | |
|---|---|---|---|
| 1,325,936 | 12/1919 | Fouasse | 350—253 |
| 3,225,307 | 12/1965 | Weissman | 331—94.5 |
| 3,229,224 | 1/1966 | Waly et al. | 331—94.5 |
| 3,252,110 | 5/1966 | Gustafson et al. | 331—94.5 |
| 3,400,596 | 9/1968 | Laich | 331—94.5 |

JOHN KOMINSKI, Primary Examiner

U.S. Cl. X.R.

350—253; 356—112